INVENTOR.
KARL POLASEK
BY Hane and Nydick
ATTORNEYS

INVENTOR.
KARL POLASEK
BY Howard Nydick
ATTORNEYS

INVENTOR.
KARL POLASEK
BY Haane and Nydick
ATTORNEYS

United States Patent Office 3,445,816
Patented May 20, 1969

3,445,816

ARRANGEMENT FOR CONNECTION OF AT LEAST TWO CONDUCTORS

Karl Polasek, Hagersten, Sweden, assignor to Telefonaktiebolaget L M Ericsson, Stockholm, Sweden, a corporation of Sweden Filed June 9, 1965, Ser. No. 462,632
Claims priority, application Sweden, Aug. 7, 1964, 9,578/64
Int. Cl. H04q
U.S. Cl. 340—166 11 Claims

ABSTRACT OF THE DISCLOSURE

A switch for connecting two conductors comprises a voltage and current waveform sensitive memory device serially connecting the two conductors and a switching control circuit connected in parallel with the memory device. The switching control circuit includes controllable voltage sources and a voltage and current waveform sensitive switching device. Both the memory device and the switching device assume high or low ohmic states in accordance with the waveforms of the voltage and currents applied thereto.

The present invention relates generically to an arrangement for the connection of at least two conductors, and is specially applicable for connection of an arbitrary line in a first number of lines to an arbitrary line in a second number of lines.

An arrangement carried out in accordance with the invention is characterized in that between the conductors there is connected a so-called memory device, and that in parallel across the memory device there is connected a series connection. The series connection comprises at least partly one first so-called switching device and a pulse voltage source controlling the first switching device for one of the two conductors, partly a second so-called switching device and a pulse voltage source controlling the second switching device for the second one of the two conductors, and partly a basic voltage source. The memory device has the property of changing from a high ohmic condition to a low ohmic condition when the voltage across it exceeds its striking voltage and to remain in the low ohmic condition when the current through it slowly falls to zero from a normal value but to change to a high ohmic condition when the current rapidly falls to zero from a value essentially exceeding said normal value. The switching devices have the property of changing from a high ohmic condition to a low ohmic condition, when the voltage across them exceeds their striking voltage and of changing from a low ohmic to a high ohmic condition, when the current through them falls to zero, and the sum of the simultaneous voltages from the pulse voltage sources and the basic voltage source exceed the required striking voltage for the memory device and the switching devices, while the sum of simultaneous voltages from the pulse voltage sources and the sustaining voltage of the memory device gives rise to a current through the memory device which essentially exceeds the normal current through the memory device.

Figure 1:
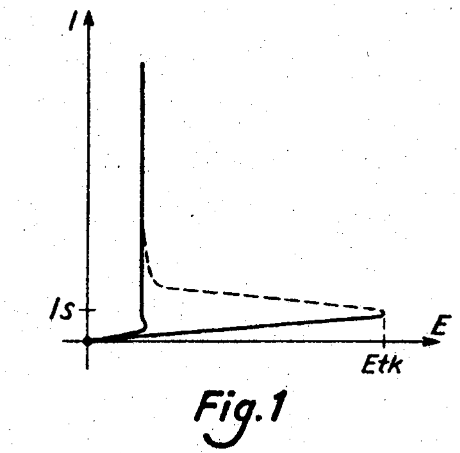
Figure 2:
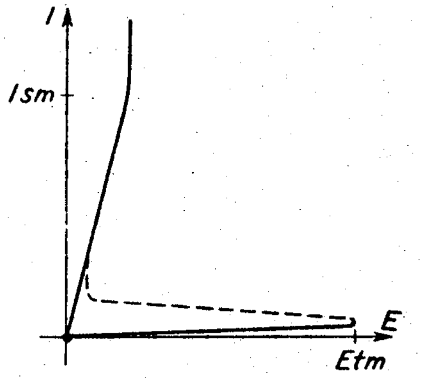
Figure 3:
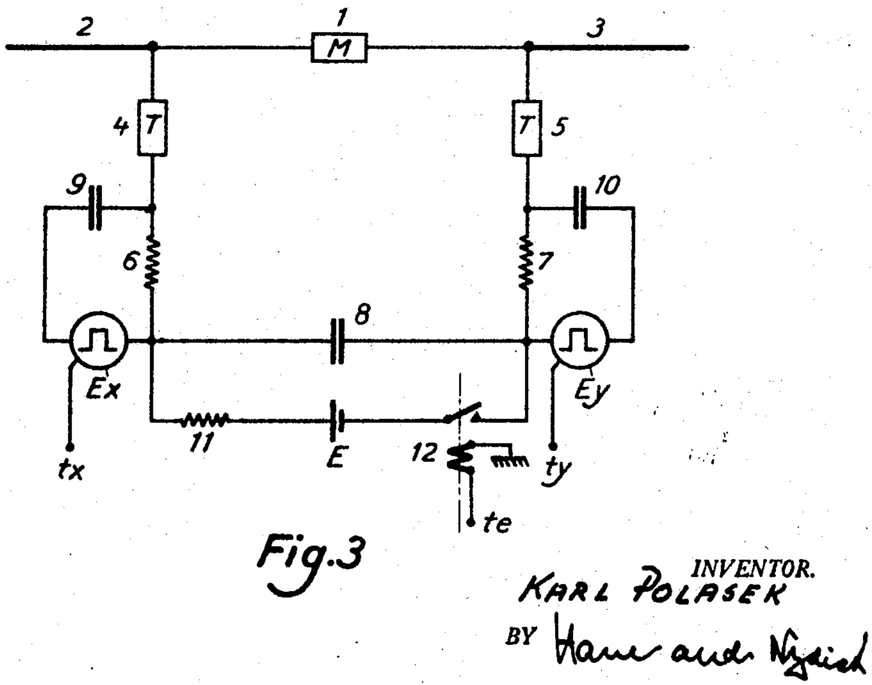
Figure 4:
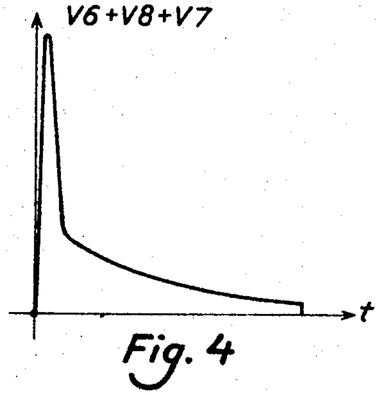
Figure 5:
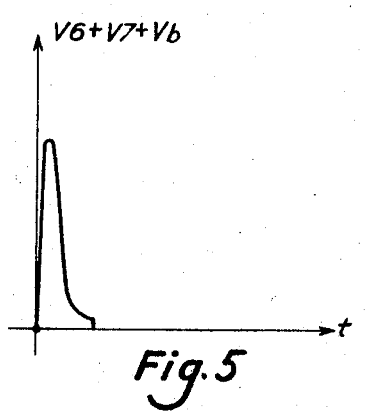
Figure 6:
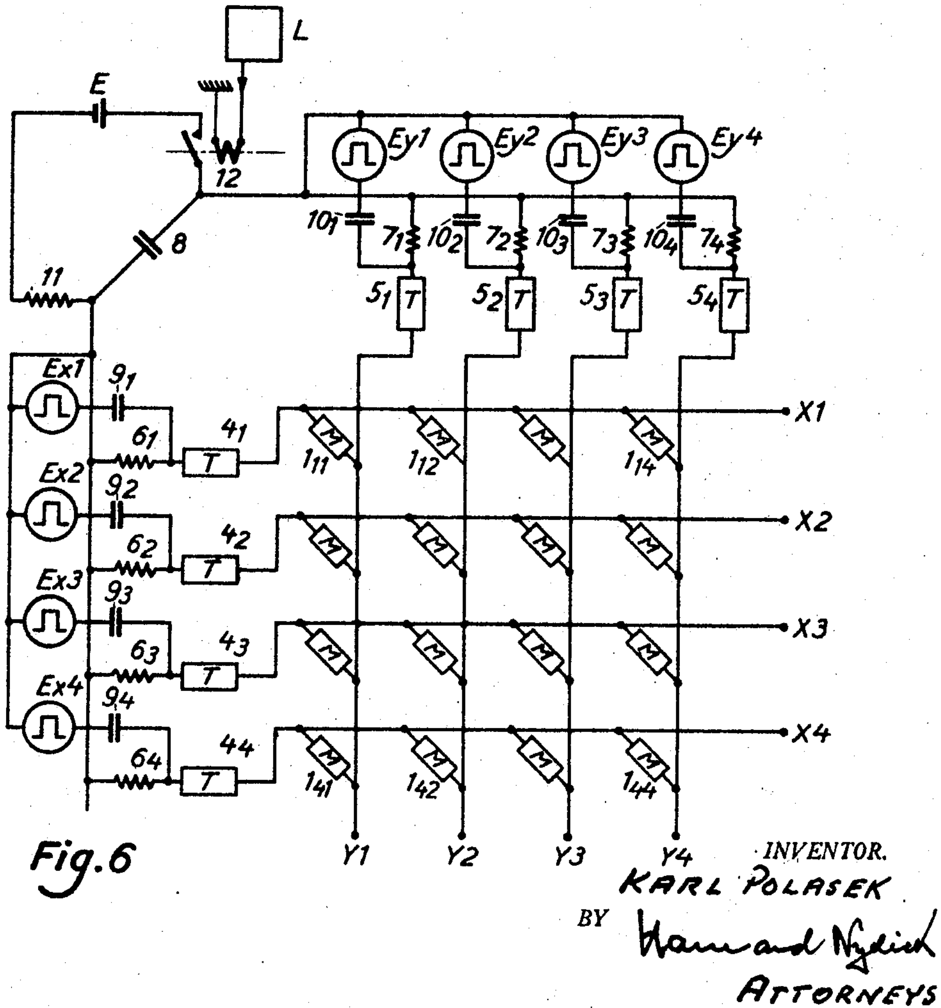
Figure 8:
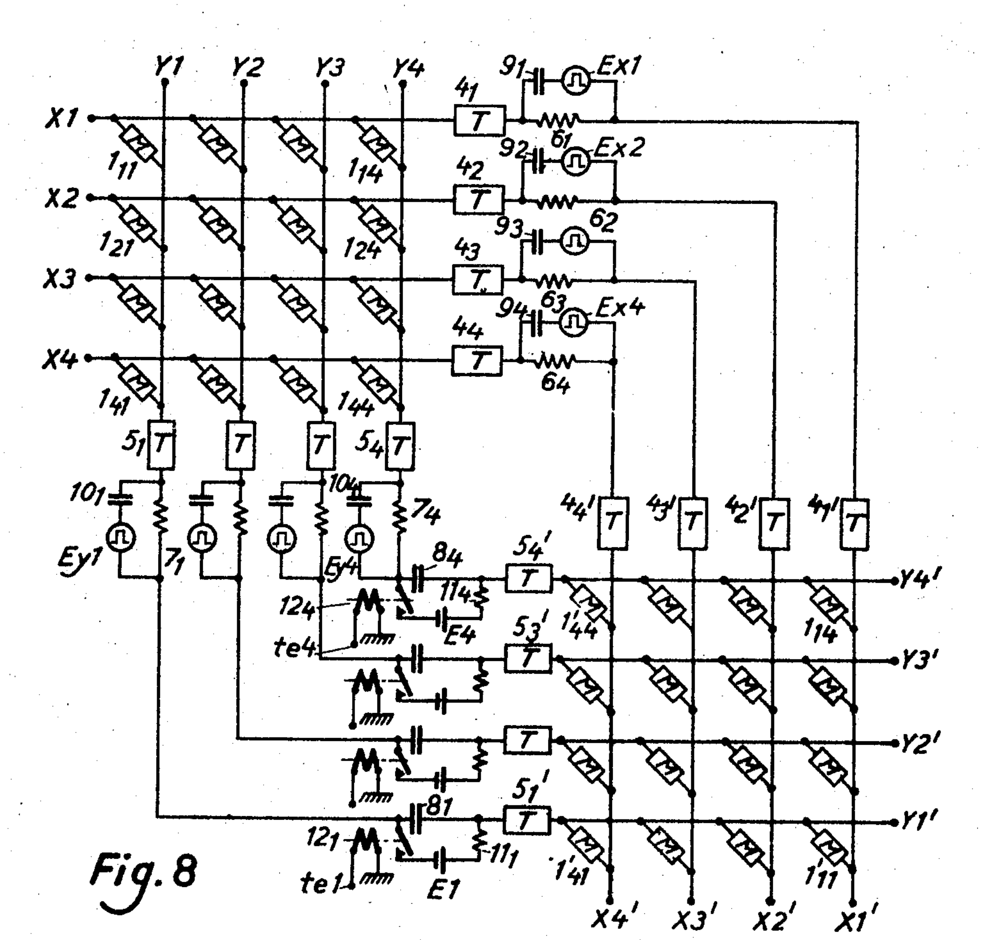
Figure 7:
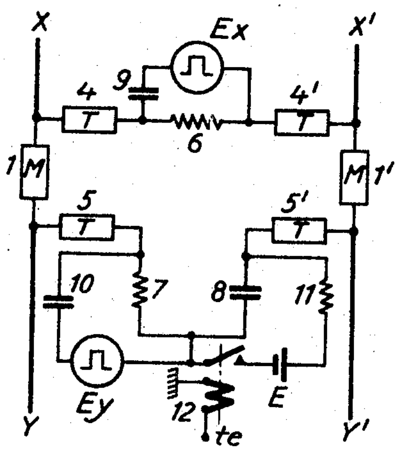

The invention will be further described in connection with the accompanying drawings, where FIGS. 1 and 2 show characteristic curves for devices included in an arrangement according to the invention, FIG. 3 shows an arrangement for the connection of two conductors, FIGS. 4 and 5 show actual pulse voltage curves in connection with the arrangement according to FIG. 3, FIG. 6 shows an arrangement for the connection of an arbitrary conductor in a first number of conductors to an arbitrary conductor in a second number of conductors, FIG. 7 shows an arrangement for the connection of two lines, and FIG. 8 shows an arrangement for the connection of an arbitrary line in a first number of lines to an arbitrary line in a second number of lines.

Devices showing unusual current-voltage characteristics were heretofore known. There are, for instance, switching devices which have the current-voltage characteristic shown in FIG. 1. Such a device has the property of changing from a high ohmic condition (10MΩ) to a low ohmic condition (10Ω) when the voltage over the device exceeds its striking voltage E*tk*, and to change from a low ohmic condition to a high ohmic condition when the current through the device falls to zero. For current values below a certain value I*s*, there is an avalanche-like flow, making it impossible to again increase the current in order to maintain the low ohmic condition. There are also so-called memory devices which show the current-voltage characteristic shown in FIG. 2 Such a device has the property of changing from a high ohmic condition to a low ohmic condition when the voltage over the device exceeds its striking voltage E*tm* and to remain low ohmic when the current through the device slowly decreases to zero from a normal value, but of changing to a high ohmic condition when the current rapidly decreases to zero from a value I*sm* essentially exceeding said normal value. Such devices can be used in arrangements which will be described hereinbelow. The devices, per se, are described in detail in United States application Ser. No. 310,407 filed Sept. 20, 1963, now issued as Patent Number 3,271,591.

The arrangement according to FIG. 3 is utilized to connect two conductors 2 and 3. Between the conductors 2 and 3 there is connected a memory device 1. In parallel across memory device 1 there is connected a series circuit comprising: partly a first switching device 4 and a pulse voltage source E*x*–6–9 (for the conductor 2) controlling the first switching device 4; partly a second switching device 5 and a pulse voltage source E*y*–7–10 (for the conductor 3) controlling the second switching device 5; and partly a basic voltage source E–8–11–12. The pulse voltage source E*x*–6–9 consists of a voltage source E*x* connected to a capacitor 9 via a resistance 6. The pulse voltage source E*y*–7–10 consists of a voltage source E*y* connected to a capacitor 10 via a resistance 7. The basic voltage source E–8–11–12 consists of a direct voltage source E connected to a capacitor 8 via a resistance 11 and a relay 12. The capacitor 8 and the resistances 6 and 7 are in a series circuit with the switching devices 4 and 5 and the memory device 1. The details included in the arrangement are so dimensioned that the sum of arbitrary voltages from the pulse voltage sources and the basic voltage source exceeds the required total striking voltage for the memory device 1 and the switching devices 4 and 5, while the sum of simultaneous voltages from the pulse voltage sources and the sustaining voltage of the memory device 1 gives rise to a current I*sm* through the memory device which essentially exceeds the normal current through the memory device.

The arrangement now described is intended to function in the following way: When the conductors 2 and 3 are to be connected, partly an operating impulse is sent to the relay terminal *te*, and partly, somewhat later, simultaneous striking impulses are fed to the voltage sources E*x* and E*y* on the striking electrodes *tx* and *ty* respectively. The capacitor 8 is then already charged from the direct voltage source E when the striking impulses are given. The total voltage $V6+V8+V7$ across devices 4, 1 and 5 will therefore be higher than the required sum-striking voltage $2 \cdot Etk+Etm$. Accordingly, the three devices 4, 1 and 5 each assume the low ohmic condition. When the operating impulse ceases the relay 12 releases. The voltage $V6+V8+V7$ slowly decreases to zero—see FIG. 4—therefore affecting the current through the three devices, with the result that the devices 4 and 5 changes to the high ohmic condition while the device 1 will remain in the low ohmic condition. The conductors 2 and 3 are now positively connected and can conduct a certain normal current without changing the character of the memory device 1.

When it is desired to break the connection between the conductors 2 and 3, the memory device 1 is transferred to its high ohmic condition by simultaneously applying striking impulses to the voltage sources $Ex$ and $Ey$. The capacitor 8 is discharged. The total voltage $V6+V7+Vb$, where $Vb$ is the sustaining voltage of the memory device 1, over the devices 4 and 5 will hereby be higher than the required sum-striking voltage $2\cdot Etk$, and the devices 4 and 5 will change to the low ohmic condition. The voltage $V6+V7+Xb$ gives rise to a current $Ism$ through the memory device 1, which essentially exceeds the earlier mentioned normal current, and voltage $V6+V7+Vb$ will rapily decrease to zero—see FIG. 5—which therefore affects the current through the three devices, with the result that all the three devices 4, 5 and 1 change to high ohmic condition. Thereby the connection between the lines 2 and 3 is broken.

If one starts from the fact that the striking voltage of the memory device 1 on the one hand and the striking voltage of the switching device 4, 5 on the other hand are equal, that is voltage $Etm=Etk=Et$, then, at the connection of the conductors 2 and 3, the total voltage $V6+V7+V8=Etot$ will amount to $$Etm+2\cdot Etk=(kt+2\cdot kx)\cdot 3Et$$

where $V8=kt\cdot 3Et$ and $V6=V7=kx\cdot 3Et$. If at one time only one of the voltage sources $Ex$ and $Ey$ will receive a striking impulse then connection shall not occur. In this case the total voltage will for instance be $V6+V8$, that is $(kt+kx)\cdot 3Et$. The safety factor S (the ratio of the voltage required for striking all three elements to the voltage obtained when only one source is energized) so that no connection shall occur amounts to $$S=\frac{(kt+2kx)\cdot 3Et}{(kt+kx)\cdot 3Et}=\frac{1}{kt+kx}=\frac{1}{1-kx}$$

It is therefore apparent that the safety factor increases with increasing $kx$, that is with the increased part of the total voltage $3Et$ that the pulse voltage sources generates. Owing to the mechanics when breaking a made connection the basic voltage must not be zero at the connection, and therefore also the condition $kx<0.5$ is obtained.

If on one occasion the voltage sources $Ex$ and $Ey$ receive striking impulses but the basic voltage V8 is not present, the connection will not take place. In this case the waveform of the total voltage $V6+V7$ will be a very short spike, the amplitude of which being not sufficient for operation. The safety factor S' so that in this case is $$S'=\frac{(kt+2kx)\cdot 3Et}{2kx\cdot 3Et}=\frac{1}{2kx}$$

For $S=S'$ is obtained $kx=1/3$, which gives $kt=1/3$ and the optimal safety factor for the two cases now mentioned $Sopt=1,5$. It should be noted that voltage V6 is the voltage across resistor 6, V7 is the voltage across resistor 7 and V8 the voltage across capacitor 8.

The arrangement according to FIG. 6 is intended for the connection of an arbitrary conductor in a first number fo conductors X1, X2 . . . X4 with an arbitrary conductor in a second number of conductors Y1, Y2 . . . Y4. Each conductor, for instance X1, in the first number of conductors is connected via the memory components $1_{11}$, $1_{12}$ . . . $1_{14}$, individually, to each conductor in the second number of conductors. For each one of all the conductors, for instance X1, there is a switching device $4_1$ and a pulse voltage source $Ex1$–$6_1$–$9_1$ controlling the switching device. The connection point between the voltage source $Ex1$ and the resistance $6_1$ in the pulse voltage sources for the first number of conductors is connected to the connection point between the resistance 11 and the capacitor 8 in the basic voltage source E–8–11–12. The connection point between the voltage source $Ey1$ and the resistance $7_1$ in the pulse voltage sources for the second number of conductors is connected to the connection point between the relay 12 and the capacitor 8 in the basic voltage source. The relay 12 receives controlling impulses from a logic circuit L.

The function of the arrangement now described is analogous to the function of the arrangement according to FIG. 3. If, for instance, a connection between the lines X1 and Y4 is wanted, an operating impulse is at first fed to the relay 12 and then striking impulses to the voltage sources $Ex1$ and $Ey4$. By this, the memory device $1_{14}$ and the switching devices $4_1$ and $5_4$ are at first struck, and then the switching devices are quenched again and thereby revert to high ohmic condition while the memory device $1_{14}$ will remain in the low ohmic state. The relay 12 receives a release impulse. The conductors X1 and Y4 are now durably connected. When breaking this connection striking impulses are again fed to the voltage sources $Ex1$ and $Ey4$, but now the capacitor 8 is uncharged because relay 12 has not been operated. The memory device $1_{14}$ reverts to its high ohmic condition and the connection is broken.

The arrangement according to FIG. 7 is intended for the connection of two lines X—X' and Y—Y' each containing two conductors. In parallel over the memory device 1 between a conductor X in the line X—X' and a conductor Y in the line Y—Y' is connected a series connection comprising a first switching device 4, a pulse voltage source $Ex$–6–9 controlling first switching device 4, a second switching device 4', a memory device 1' between the remaining conductors X' and Y' of the lines, a third switching device 5', a basic voltage source E–8–11–12, a pulse voltage source $Ey$–7–10 controlling a fourth switching device 5, and the switching device 5. The function of the arrangement just described is analogous to the earlier described function for, for instance, the arrangement according to FIG. 1.

The arrangement according to FIG. 8 is intended for connection of an arbitrary line in a first number of lines X1—X1', X2—X2' . . . X4—X4' with an arbitrary line in a second number of lines Y1—Y1', Y2—Y2' . . . Y4—Y4'. A conductor, for instance X1 in each line in the first number of lines is via a memory device $1_{11}$, $1_{12}$ . . . $1_{14}$ individually connected to a conductor Y1, Y2 . . . Y4 in each one of the lines in a second number of lines. The remaining conductor X1' in the lines in the first number of lines is via a memory device $1_{11}'$, $1_{12}'$ . . . $1_{14}'$ individually connected to the remaining conductor Y1', Y2' . . . Y4' in each of the conductors in the second number of lines. For a conductor, for instance X1, in all the lines there is a switching device, $4_1$, and a pulse voltage source $Ex1$–$6_1$–$9_1$ controlling the switching device. The connection point between a voltage source, $Ex1$, and a resistance $6_1$ in an arbitrary pulse voltage source is over a switching device, $4_1'$, connected to the remaining conductor E1', in the line, X1—X1', in question. Between the pulse voltage source, for instance $Ey4$–$7_4$–$10_4$, and one of the switching device, $5_4'$, for an arbitrary line in the second number of lines is connected a basic voltage source, E4–$8_4$–$11_4$–$12_4$. It can of course as well instead be connected between the corresponding units, for instance $Ex4$–$6_4$–$9_4$ and $4_4'$, for the lines in the first number of lines.

If a connection of the line X1—X1' to the line Y1—Y1' is wanted, an operation impulse is fed to input *tel* and striking impulses are fed to the voltage sources $Ex1$ and $Ey1$. Accordingly, the devices $1_{11}$–$4_1$–$4_1'$–$1_{11}'$–$5_1'$–$5_1$ will be low ohmic, and thereafter the devices $4_1$–$4_1'$–$5_1'$–$5_1$ will revert to their high ohmic condition. When the connection is to be broken striking impulses are again fed to the same voltage sources, but the capacitor $8_1$ is discharged and the relay $12_1$ interrupts the voltage $E_1$. Thereby also the memory device $1_{11}$ and $1_{11}'$ will revert to their high ohmic condition and the connection is broken.

I claim:

1. Apparatus for connecting at least two conductors, comprising: a memory device means connecting said two conductors, said memory device means having the property of changing from a high ohmic condition to a low ohmic condition when a voltage across it exceeds a striking voltage and remains in said low ohmic condition when the current through it slowly falls to zero from a normal value but changes back to said high ohmic condition when the current through it rapidly falls to zero from a value greater than said normal value; and a switching control circuit connected in parallel with said memory means, said switching control circuit comprising the serial combination of at least one switching means and a basic voltage source, means for controllably activating said basic voltage source, said switching means including a switching device means and a pulse voltage source means for controlling said switching device means, said switching device means having the property of changing from a high ohmic condition to a low ohmic condition when the voltage across it exceeds a striking voltage and of changing from the low ohmic condition to the high ohmic condition when the current through it falls to zero; the sum of simultaneous voltages from said basic voltage source and said pulse voltage source means exceeding the striking voltage for said memory device means and said switching device means while the sum of simultaneous voltages from said pulse voltage source means and the sustaining voltage of said memory device means gives rise to a current through said memory device means which exceeds said normal value.

2. Apparatus for connecting at least two conductors, comprising: a memory device means connecting said two conductors, said memory device means having the property of changing from a high ohmic condition to a low ohmic condition when a voltage across it exceeds a striking voltage and remains in said low ohmic condition when the current through it slowly falls to zero from a normal value but changes back to said high ohmic condition when the current through it rapidly falls to zero from a value greater than said normal value; and a switching control circuit connected in parallel with said memory means, said switching control circuit comprising the serial combination of a first switching means, a basic voltage source and a second switching means connected in that order, means for controllably activating said basic voltage source, each of said switching means including a switching device means and a pulse voltage source means for controlling said switching device means, said switching device means having the property of changing from a high ohmic condition to a low ohmic condition when the voltage across it exceeds a striking voltage and of changing from the low ohmic condition to the high ohmic condition when the current through it falls to zero; the sum of simultaneous voltages from said basic voltage source and said pulse voltage source means exceeding the striking voltage for said memory device means and said switching device means while the sum of simultaneous voltages from said pulse voltage source means and the sustaining voltage of said memory device means gives rise to a current through said memory device means which exceeds said normal value.

3. The apparatus of claim 1, wherein in each of said switching means the switching device means is serially connected to the associated pulse voltage source means.

4. The apparatus of claim 1, wherein said basic voltage source comprises a capacitor and, in parallel with said capacitor, a source of voltage and an electrically operable switch.

5. The apparatus of claim 4, wherein each of said pulse voltage source means comprises a resistance and in parallel therewith the serial combination of a capacitor and a source of voltage pulses.

6. Apparatus for connecting two lines each having two conductors, comprising: a first memory device means for connecting a first conductor of one of said two lines to a first conductor of the other of said two lines; a second memory device means for connecting a second conductor of one of said two lines to a second conductor of the other of said two lines, each of said memory device means having the property of changing from a high ohmic condition to a low ohmic condition when a voltage across it exceeds a striking voltage and remains in said low ohmic condition when the current through it slowly falls to zero from a normal value but changes back to said high ohmic condition when the current through it rapidly falls to zero from a value greater than said normal value; a first switching control circuit connected across the two conductors of one of said two lines, said first switching control circuit comprising at least one switching device means and a pulse voltage source means for controlling said switching device means, said switching device means having the property of changing from a high ohmic condition to a low ohmic condition when the voltage across it exceeds a striking voltage and of changing from the low ohmic condition to the high ohmic condition when the current through it falls to zero; and a second switching control circuit connected across the two conductors of the other of said two lines, said second switching control circuit comprising the serial combination of at least one switching means and a basic voltage source, means for controllably activating said basic voltage source, said switching means including a switching device means and a pulse voltage source means for controlling said switching device means, said switching device means having the property of changing from a high ohmic condition to a low ohmic condition when the voltage across it exceeds a striking voltage and of changing from the low ohmic condition to the high ohmic condition when the current through it falls to zero.

7. Apparatus for connecting an arbitrary conductor of a first plurality of conductors to an arbitrary conductor of a second plurality of conductors, comprising: a plurality of memory device means, each of said memory device means individually connecting one of the conductors of the first plurality of conductors to one of the conductors of the second plurality of conductors, each of said memory device means having the property of changing from a high ohmic condition to a low ohmic condition when a voltage across it exceeds a striking voltage and remains in said low ohmic condition when the current through it slowly falls to zero from a normal value but changes back to said high ohmic condition when the current through it rapidly falls to zero from a value greater than said normal value; a plurality of switching means, each of said switching means having a first terminal means connected to one of said conductors, respectively, and a second terminal means, each of said switching means further including a switching device means and a pulse voltage source means for controlling said switching device means, said switching device means having the property of changing from a high ohmic condition to a low ohmic condition when the voltage across it exceeds a striking voltage and of changing from the low ohmic condition to the high ohmic condition when the current through it falls to zero; first junction means for connecting together the second terminal means of each of said switching means associated with the first plurality of conductors; second junction means for connecting together the second terminal means of each of said switching means associated with the second plurality of conductors; and switchably operable basic voltage source means connected across said first and second junction means.

8. The apparatus of claim 7, wherein each of said pulse voltage source means comprises a resistance and in parallel therewith the serial combination of a capacitor and source of voltage pulses, and connects the associated switching device means to the associated first terminal means.

9. The apparatus of claim 8, wherein said basic voltage source comprises a capacitor, and in parallel with said capacitor, a source of voltage and an electrically operable switch.

10. Apparatus for connecting an arbitrary line of a first plurality of lines to an arbitrary line of a second plurality of lines, wherein each line includes two conductors comprising: a plurality of pairs of memory device means, each of the memory device means of each pair individually connecting a conductor of the first plurality of lines to a conductor of the second plurality of lines, said memory device means having the property of changing from a high ohmic condition to a low ohmic condition when a voltage across it exceeds a striking voltage and remains in said low ohmic condition when the current through it falls to zero from a normal value but changes back to said high ohmic condition when the current through it rapidly falls to zero from a value greater than said normal value; a plurality of first switching control circuits, each of said first switching control circuits being connected across the two conductors of said first plurality of lines, respectively, each of said first switching control circuits comprising at least one switching device means and a pulse voltage source means for controlling said switching device means, said switching device means having the property of changing from a high ohmic condition to a low ohmic condition when the voltage across it exceeds a striking voltage and of changing from the low ohmic condition to the high ohmic condition when the current through it falls to zero; and a plurality of second switching control circuits connected across the two conductors of each of the second plurality of lines, each of said second switching control circuits comprising the serial combination of at least one switching means and a basic voltage source, means for controllably activating said basic voltage source, said switching means including a switching device means and a pulse voltage source means for controlling said switching device means, said switching device means having the property of changing from a high ohmic condition to a low ohmic condition when the voltage across it exceeds a striking voltage and of changing from the low ohmic condition to the high ohmic condition when the current through it falls to zero.

11. The apparatus of claim 10, wherein each of said first switching control circuits comprises a switching device means, a pulse voltage source means and another switching device means serially connected in that order, and each of said second switching control circuits comprising a switching device means, said basic voltage source, a pulse voltage source means and another switching device means connected serially in that order.

References Cited

UNITED STATES PATENTS

| | | | |
|---|---|---|---|
| 3,014,202 | 12/1961 | Hanewinkel | 340—166 |
| 3,097,307 | 7/1963 | Bonn | 340—166 XR |
| 3,176,273 | 3/1965 | Deller et al. | 340—166 |

DONALD J. YUSKO, *Primary Examiner.*